United States Patent Office 2,782,181
Patented Feb. 19, 1957

2,782,181
OXIDIZABLE RUBBER CONTAINING A PHTHALIDYL PHENOL AS ANTIOXIDANT

Joseph F. Shekleton, Lyndhurst, Ohio, assignor to The Goodyear Tire & Rubber Company, Akron, Ohio, a corporation of Ohio No Drawing. Application February 23, 1954,
Serial No. 412,079

7 Claims. (Cl. 260—45.8)

This invention relates to the preservation of rubber. More particularly it relates to a new class of age resisters which, when incorporated into rubber, markedly improve the aging characteristics of the rubber and its resistance to deterioration. Various materials for improving the aging characteristics of rubber are known. The action of these age resisters is somewhat specific in that some of them are particularly effective in retarding the absorption of oxygen by a rubber, others are especially effective in retarding surface checking or cracking, and some are particularly effective in retarding high temperature deterioration. Many age resisters, or antioxidants, combine certain of these functions. Some have the added advantage that they do not impart color to a rubber.

According to the present invention, a new class of age resisters has been discovered which may be described as phthalidyl phenols.

The new compositions correspond to the general formula

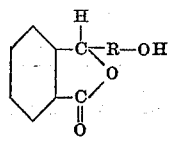

wherein R is an aromatic radical having from 1 to 4 substituents, said substituents being selected from the group consisting of hydrogen, alkyl groups, phenyl groups, phenylalkyl groups and cycloalkyl groups. The aromatic radical is selected from the benzene and naphthalene series. It can contain substitution in any position not substituted with the phthalidyl radical or the hydroxyl radical. In the preferred compositions, R represents a benzene ring containing a secondary or tertiary alkyl group, preferably in the position ortho or para to the hydroxyl.

The phthalidyl phenols of this invention can be prepared by the condensation of o-phthalaldehydic acid and a phenol in the presence of one or more of the customary condensation agents. For best results, the condensation is completed at reduced temperatures. The condensation products can in some cases be isolated as pure materials, but for the ordinary practice of this invention such isolation or purification is not necessary. The crude mixtures resulting from the condensation reaction can be washed with water and then dried. This product possesses superior antioxidant qualities and is, of course, much cheaper than the isolated or purified material. The crude, unpurified condensation products are usually mushy, lumpy, colorless, semifluid masses, these characteristics being controlled somewhat by selection of the phenolic reactant. As a class, the antioxidants of this invention are nonstaining antioxidants, i. e. they do not migrate to the surface of a rubber product and oxidize to cause discoloration.

As mentioned, the new compounds of this invention can be described as phthalidyl phenols. Of these, substituted phthalidyl phenols having aliphatic or aromatic substituents on the phenolic ring, such as the phthalidyl alkyl phenols or the phthalidyl phenyl phenols, represent especially useful classes of materials because they are economically prepared and because they contain no unsaturation which might cause undesirable side reactions. For example, the alkyl-substituted phthalidyl phenols and the alkyl-substituted phthalidyl cresols are particularly good antioxidants, the phthalidyl alkyl-substituted para-cresols being preferred. Generally, it is preferred that the alkyl groups contain not over 10 carbon atoms and that at least one alkyl group contain more than one carbon atom.

The phenolic radical may be provided by any aromatic hydroxy compound. The phenolic radical may be dihydroxy or polyhydroxy, although it is preferable that it be monohydroxy and that the hydroxyl radical be located ortho or para to the phthalidyl radical. The phenolic radical can contain a nucleus having more than one benzene ring. For example, the naphthols are useful in the practice of this invention, although a phenolic compound having a single benzene nucleus is preferred. The benzene nucleus can contain ring substituents in any position not occupied by a hydroxyl group, although it is desirable to have a position ortho or para to the hydroxyl of the phenolic reactant available because it provides better reaction conditions. For example, the benzene nucleus can contain substituents such as alkyl, phenyl, phenylalkyl, and/or cycloalkyl groups.

Because they represent a class of compounds which display superior antioxidant qualities, phthalidylalkyl phenols having at least one alkyl group with more than one carbon atom are preferred. In order to provide greater antioxidant activity, it is preferable that at least one substituent be a secondary or tertiary alkyl radical.

In the practice of the invention, phthalidyl phenols having desired characteristics can be obtained by reacting ortho phthalaldehydic acid with a selected alkylated phenol. In this manner, antioxidant properties can be controlled.

Representative examples of compositions useful in the practice of the invention are:

Phthalidyl phenol
Phthalidyl m-cresol
Phthalidyl p-cresol
Phthalidyl o-cresol
Phthalidyl resorcinol
Phthalidyl orcinol
Phthalidyl pyrogallol
Phthalidyl α-phenylethyl-p-cresol
Phthalidyl p-tertiary-butyl-p-cresol
Phthalidyl p-tertiary-butyl-o-cresol
Phthalidyl o-tertiary-butyl-o-cresol
Phthalidyl mono-tertiary-butyl-o-isopropyl phenol
Phthalidyl p-isooctyl phenol
Phthalidyl 4,6-di-tertiary-butyl-m-cresol
Phthalidyl β-naphthol
Phthalidyl α-naphthol
Phthalidyl p-chlorophenol
Phthalidyl p-tertiary-butyl phenol
Phthalidyl o-tertiary-butyl phenol
Phthalidyl o-tertiary-butyl-p-cresol
Phthalidyl p-isooctyl-o-cresol
Phthalidyl 2,4-di-tertiary-butyl phenol
Phthalidyl o-bromo-o-cresol
Phthalidyl o-bromo-m-cresol
Phthalidyl o-nitro-o-cresol
Phthalidyl o-methoxy phenol The preparation of the antioxidants of the invention is illustrated by the following representative examples:

EXAMPLE 1

Ortho - phthalidyl mono - tertiary - butyl - o - isopropyl phenol was prepared in the following manner:

Thirty-eight and four-tenths grams of mono-tertiary-butyl-ortho-isopropyl phenol and 200 grams of 95% sulfuric acid were cooled in an ice bath. To the cooled mixture 30 grams of o-phthalaldehydic acid were added. This reaction mixture was allowed to stand for 6 hours with occasional stirring. After that, the temperature of the mixture was allowed to rise slowly to room temperature during a period of 16 hours. Thereafter, the mixture was diluted with 500 milliliters of water in order to dilute the sulfuric acid which was thereafter decanted from the heterogeneous agglomerate. The residue was washed again and then dried over anhydrous calcium chloride until there was no observable loss of weight.

EXAMPLE 2

Phthalidyl-para-tertiary-butyl-ortho-cresol was prepared by condensing ortho-phthalaldehydic acid and para-tertiary-butyl-ortho-cresol. Fifteen grams of ortho-phthalaldehydic acid, 16.5 grams of para-tertiary-butyl-ortho-cresol and 100 grams of concentrated sulfuric acid were mixed at room temperature and allowed to stand for about 18 hours. During this time the mixture was stirred periodically. The mixture was then diluted with 250 cc. of water, cooled to room temperature and filtered. The resultant white solid was warmed with 100 grams of 5% sodium hydroxide and allowed to stand over a week-end. The mixture was then filtered and the white solid was again washed with 100 cc. of water and then dried over calcium chloride, thus providing the indicated composition.

EXAMPLE 3

Phthalidyl-ortho-tertiary-butyl-ortho-cresol was prepared by mixing together 15.0 grams of ortho-phthalaldehydic acid, 16.4 grams of ortho-tertiary-butyl-ortho-cresol and 100 grams of concentrated sulfuric acid. This mixture was allowed to stand at room temperature, with occasional stirring for a period of 70 hours. The mixture was then washed four times with 250 cc. portion of water and finally filtered and dried over anhydrous calcium chloride, thus providing a sticky, glassy material which was the indicated product.

EXAMPLE 4

Phthalidyl mono-α-phenylethyl-p-cresol was prepared as follows:

Thirty grams of phthalaldehydic acid were dissolved in 42.4 grams of mono-o-α-phenylethyl-p-cresol while warming the mixture. This composition was then chilled in an ice bath. Thereafter 65 grams if ice cold $H_2SO_4$ were stirred into the mixture. Intermittent stirring and shaking were continued for three hours after which the mixture was packed in ice for a period of about 15 hours. Then the reaction mixture was warmed to room temperature, stirred, and again cooled in an ice bath. After a period of 45 hours, the sulfuric acid was diluted and decanted and the resultant product washed three times in hot ethyl alcohol, thus providing the indicated compound.

EXAMPLE 5

Ortho-phthalidyl mono-octyl-p-cresol was prepared by adding 30 grams of phthalaldehydic acid to 44 grams of mono-octyl-p-cresol. The mixture was warmed in order to effect solution and then cooled. Thereafter, it was treated with 81 grams of concentrated (73%) sulfuric acid. This mixture was shaken in a mechanical shaker for 30 minutes after which the product was diluted with water, filtered and washed. The resultant semisolid residue was twice washed with 300 cc. of hot ethyl alcohol and then dried. Analysis shows that a substantial amount of the indicated material was present.

Various other phenolic compositions can be reacted with o-phthalaldehydic acid to provide the useful phthalidyl phenols. The proportion of reactants will customarily be approximately equimolecular proportions. The temperature maintained during the reaction can vary over a substantial range and is not critical, although best results are obtained by keeping the temperature below the normal room temperature.

Any customary condensation method can be used to produce the useful products of the invention. For example, any of the common condensing agents can be used to activate the reaction and split off water. Because of the nature of the condensation reaction, it is customary to use a large excess of the condensing agent which can be recovered for reuse. Sulfuric acid, chloro-sulfonic acid, phosphorus pentoxide, boron trifluoride and aluminum chloride are examples of suitable condensing agents, sulfuric acid being preferred in the practice of this invention.

The products of this invention have been subjected to tests in order to show their superior qualities. The age-resisting qualities have been ascertained by measuring the retention of tensile strength and the increase in weight after treatment with oxygen. The antioxidants were incorporated into the following standard rubber formulation for testing:

| | |
|---|---|
| Natural rubber | 100.00 |
| Zinc oxide | 5.00 |
| Sulfur | 3.00 |
| Stearic acid | 1.50 |
| Antioxidant | 1.00 |

The following table indicates the results obtained when cured rubber samples containing the indicated products of the invention were tested:

*Table I*

[Cure—50 minutes at 285° F.]

| | Sample No. | | | | |
|---|---|---|---|---|---|
| | 1 | 2 | 3 | 4 | 5 |
| Unaged Data: | | | | | |
| Original tensile | 2,000 | 1,700 | 1,550 | 1,400 | 1,400 |
| Original elongation | | 830 | 840 | 800 | 810 |
| Aged under pressure at 50° C. 6 days in an $O_2$ bomb: | | | | | |
| Percent tensile retention | 0 | 80.9 | 114.5 | 107.1 | 125.0 |
| Percent weight gain | 15.3 | 0.38 | 0.02 | 0.06 | 0.06 |
| Aged under pressure at 50° C. for 12 days in an $O_2$ bomb: | | | | | |
| Percent tensile retention | 0 | 79.4 | 103.2 | 119.6 | 116.1 |
| Percent weight gain | 16.8 | 0.65 | 0.035 | 0.133 | 0.08 |
| Aged under pressure at 50° C. for 18 days in an $O_2$ bomb: | | | | | |
| Percent tensile retention | 0 | 58.8 | 90.3 | 110.7 | 108.9 |
| Percent weight gain | 15.7 | 0.61 | 0.14 | 0.22 | 0.13 |

Sample #1 contained no antioxidant.
Sample #2 contained a commercial nonstaining antioxidant which is a mixture of alkylated phenols.
Sample #3 contained, as an antioxidant, 2 [(3) phthalidyl] 6-tertiary-butyl-para-cresol.
Sample #4 contained, as an antioxidant, 4 [(3) phthalidyl] 6-tertiary-butyl-o-cresol.
Sample #5 contained, as an antioxidant, (3) phthalidyl, mono-tertiary-butyl-o-isopropyl phenol.

Further tests were conducted on the preferred materials to establish that the products of the invention are nonstaining and nondiscoloring. Representative products of the invention were compounded in a white rubber formula containing natural rubber, sulfur, zinc oxide, calcium carbonate, stearic acid and antioxidant in the relationship of one part antioxidant to 100 parts natural rubber. These samples, plus one sample containing a commercial nonstaining antioxidant and one sample containing no antioxidant, were exposed in a weatherometer for 48 hours. The following table summarizes the results:

Table II

| Antioxidant | Rating |
| --- | --- |
| Control—no antioxidant | no stain. |
| Antioxidant A [1] | slight stain. |
| 2[(3) phthalidyl] 6-tertiary-butyl-p-cresol | Do. |
| 4[(3) phthalidyl] 6-tertiary-butyl-o-cresol | Do. |
| (3) phthalidyl mono-tertiary-butyl-o-isopropyl phenol | Do. |

[1] A commercial nonstaining antioxidant comprising a mixture of alkylated phenols.

The term an oxidizable rubbery polymer of a conjugated diene is used herein to include natural rubber and the various synthetic diene rubbers which are similar to rubber in their aging characteristics, such as polychloroprene, butyl rubber, which is a polymerization product of a major proportion of mono-olefin, such as isobutylene, and a minor proportion of a multi-olefin, such as butadiene or isoprene; the rubbery copolymers of butadiene and styrene such as GR–S and similar compositions which contain from 50% to 75% by weight of butadiene; and the rubbery copolymers of butadiene and acrylonitrile.

The products of the invention are useful as age resisters for raw rubber in latex form, coagulated rubber latices, or vulcanized rubbers and may be present in an amount of from .25 to 5% by weight based on the weight of the rubber, although it is preferred to use from .5 to 2% by weight, based on the weight of the rubber.

While certain representative embodiments and details have been shown for the purpose of illustrating the invention, it will be apparent to those skilled in this art that various changes and modification may be made therein without departing from the spirit or scope of the invention.

I claim:

1. An oxidizable rubbery polymer of a conjugated diene containing a phthalidyl phenol as an antioxidant, the rubber portion of said rubbery composition being selected from the group consisting of natural rubber, polychloroprene, the copolymers of isobutylene with butadiene, the copolymers of isobutylene with isoprene, the copolymers of butadiene with styrene and the copolymers of butadiene with acrylonitrile.

2. An oxidizable rubbery polymer of a conjugated diene containing a phthalidyl phenol.

3. An oxidizable rubbery polymer of a conjugated diene containing a phthalidyl alkyl phenol.

4. An oxidizable rubbery polymer of a conjugated diene containing a phthalidyl alkyl phenol wherein at least one alkyl group contains more than one carbon atom.

5. An oxidizable rubbery polymer of a conjugated diene containing a phthalidly alkyl phenol wherein at least one alkyl group contains more than one carbon atom and wherein at least one alkyl group contains a secondary carbon atom.

6. An oxidizable rubbery polymer of a conjugated diene containing phthalidly alkyl phenol wherein at least one alkyl group contains more than one carbon atom and wherein at least one alkyl group contains a tertiary carbon atom.

7. An oxidizable rubbery polymer of a conjugated diene containing

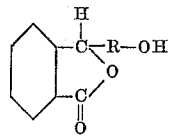

wherein R is an aromatic radical having from 1 to 4 substituents, said substituents being selected from the group consisting of hydrogen, alkyl groups, phenyl groups, phenylalkyl groups and cycloalkyl groups, and wherein at least one substituent contains a linking carbon atom selected from the group consisting of a secondary carbon atom and a tertiary carbon atom.

No references cited.